United States Patent [19]

Okabe et al.

[11] Patent Number: 4,627,743

[45] Date of Patent: Dec. 9, 1986

[54] MEASURING TEMPERATURE OF A HEATED METAL

[75] Inventors: Takahiro Okabe, Nagoya; Masashi Mizuno, Chita, both of Japan

[73] Assignees: Educational Foundation Daido Gakuen; Daido Tokushuko Kabushiki Kaisha, both of Nagoya, Japan

[21] Appl. No.: 632,360

[22] Filed: Jul. 19, 1984

[30] Foreign Application Priority Data

Jul. 19, 1983 [JP] Japan .................................. 58-131631

[51] Int. Cl.⁴ ............................. G01J 5/06; G01J 5/10
[52] U.S. Cl. .................................... 374/122; 374/129; 374/132
[58] Field of Search ............... 374/122, 129, 164, 132, 374/124; 324/585 B; 455/617, 619

[56] References Cited

U.S. PATENT DOCUMENTS

| | | | |
|---|---|---|---|
| 654,630 | 7/1900 | Hayes et al. | 455/617 |
| 1,766,148 | 6/1930 | Sawyer | 374/164 |
| 1,954,204 | 4/1934 | Hayes | 455/619 |
| 3,433,052 | 3/1969 | Maley | 374/129 X |
| 3,446,074 | 5/1969 | Thomas | 374/122 |
| 3,465,339 | 9/1969 | Marner | 374/122 |
| 3,492,869 | 2/1970 | Toyoto et al. | 374/129 X |
| 3,527,097 | 9/1970 | Deczky | 374/129 |
| 3,536,029 | 10/1970 | Kuwayama et al. | 374/129 X |
| 3,777,270 | 12/1973 | Hardy et al. | 374/122 X |
| 4,004,219 | 1/1977 | Tiuri et al. | 374/122 |
| 4,106,340 | 8/1978 | Hamid | 374/122 X |
| 4,144,758 | 3/1979 | Roney | 374/129 |
| 4,435,092 | 3/1984 | Iuchi | 374/129 |

FOREIGN PATENT DOCUMENTS 32-96225 6/1957 Japan .

OTHER PUBLICATIONS

"Composite Temperature-Pressure Measurement" T. Roger Billetes, 1971 Nuclear Science Symposium (Nov. 3-5, 1971).

Primary Examiner—Daniel M. Yasich
Attorney, Agent, or Firm—Armstrong, Nikaido, Marmelstein & Kubovcik

[57] ABSTRACT

The temperature of an object within a heating furnace is accurately measured, even in a contaminated atmosphere, by receiving microwaves within a specific 1 to 10 cm wavelength range by means of an antenna provided near the wall of the furnace facing the surface of the object to be measured. The temperature of the object is obtained by amplifying, and converting the relative intensity of the microwaves. The antenna is preferably in the form of a parabolic antenna having a heat insulating material applied to its front surface to maintain a constant temperature, and a circuit added to compensate for any sensitivity fluctuation due to temperature changes in the parabolic antenna.

2 Claims, 3 Drawing Figures

MEASURING TEMPERATURE OF A HEATED METAL

BACKGROUND OF THE INVENTION

1. Field of the Invention

The present invention relates to an improved method for measuring the temperature of an object and also includes the apparatus used to implement this method.

2. State of the Art

When, for example, a piece of steel or other metal is heated for such purposes as hot working or heat treatment, it is not easy to accurately measure the temperature of the piece. In cases where the steel materials are heated in a heating furnace it has been common to measure the temperature of the furnace wall or the temperature of the furnace atmosphere instead of the temperature of the object. But in cases where this is not satisfactory, a radiation thermometer of an apparatus for determining the temperature of an object by measuring the intensity of infrared rays radiating from it is being widely used.

However, in ordinary furnaces using fuel gases or heavy oil, smoke or dust particles, or oxide scales are in ambient suspension. Because the burner flame emits strong infrared rays, and also because the suspended particles attenuate infrared rays emitting from the object being measured, both become sources of error in measurement. To solve this, a method being practiced is to position water-cooling pipes, provided with a canopy, close to the object being measured, in order to protect the passageway of the radiated infrared rays from the error factors. Nevertheless, when the water-cooling pipes are used to try to satisfactorily obtain this result, the temperature of the surrounding area falls and an accurate temperature can not be obtained.

SUMMARY OF THE INVENTION

The object of the present invention is to provide a technique for accurately measuring the surface temperature of a heated object without causing errors introduced by, for example, a flame or suspended particles, and also without lowering the temperature of the object.

DETAILED EXPLANATION OF THE INVENTION

The method for measuring the temperature of an object according to the present invention is characterized in that it comprises measuring the surface temperature of the object while avoiding the above-mentioned atmospheric influences by receiving microwaves of a specific wavelength radiated from the object through the atmosphere which contains the flame of a burner and suspended particles, and by determining the intensity of the microwaves relative to the intensity of microwaves radiated from a reference noise source, or in a resistor which provides a reference intensity level of the microwaves.

The theory of measuring the temperature of an object by employing microwaves radiating from the object is well known, and development of equipment for practical use also is progressing (for example, Japanese Patent Disclosure No. 57-96225). However, for the first time, we have conceived and also verified the possibility of applying this method to accurately measure the temperature of steel pieces in a heating furnace, a method that is particularly useful when the atmosphere within the furnace has become contaminated.

Figure 1:
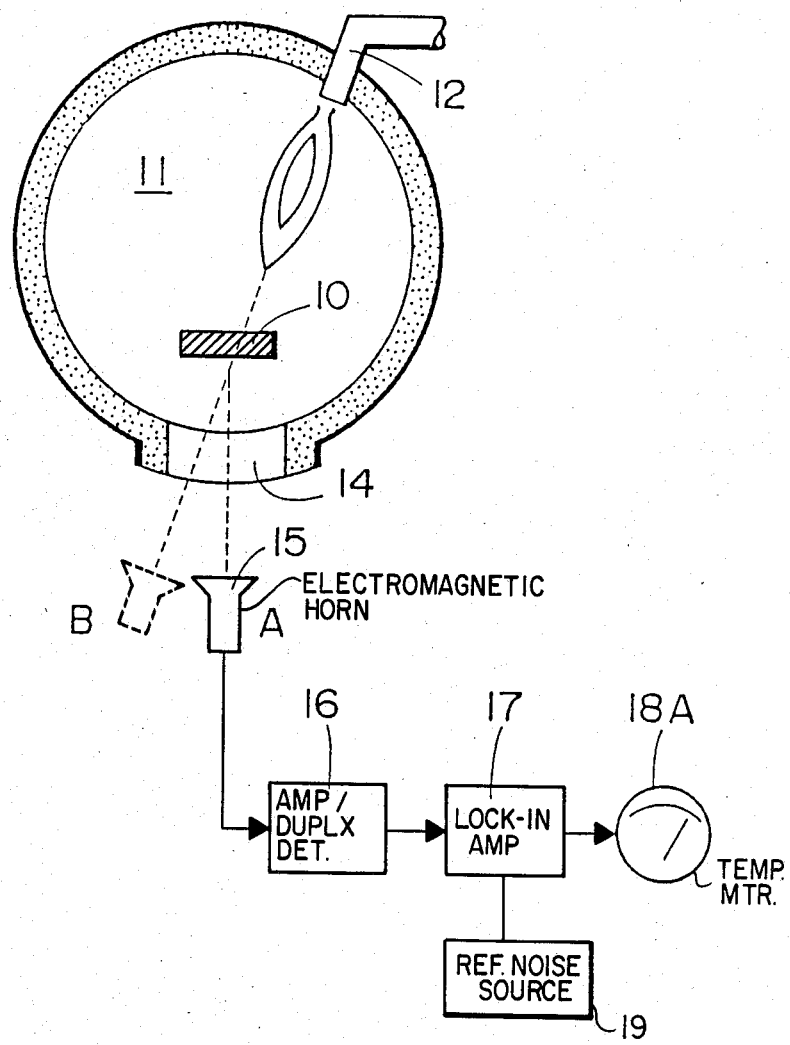
FIG. 1 is a conceptual drawing illustrating a test of the present invention nearing completion.

In order to explain the circumstances leading to perfection of the present invention, we first carried out an experiment as illustrated in FIG. 1. Namely, in a cylindrical furnace 11 with an inside diameter of 2,500 mm, we heated one side of a 200 mm×200 mm×10 mm steel plate, positioned as shown, with a burner 12. We examined the relative intensity of the microwaves being emitted from the reverse side of this steel plate.

Figure 2:
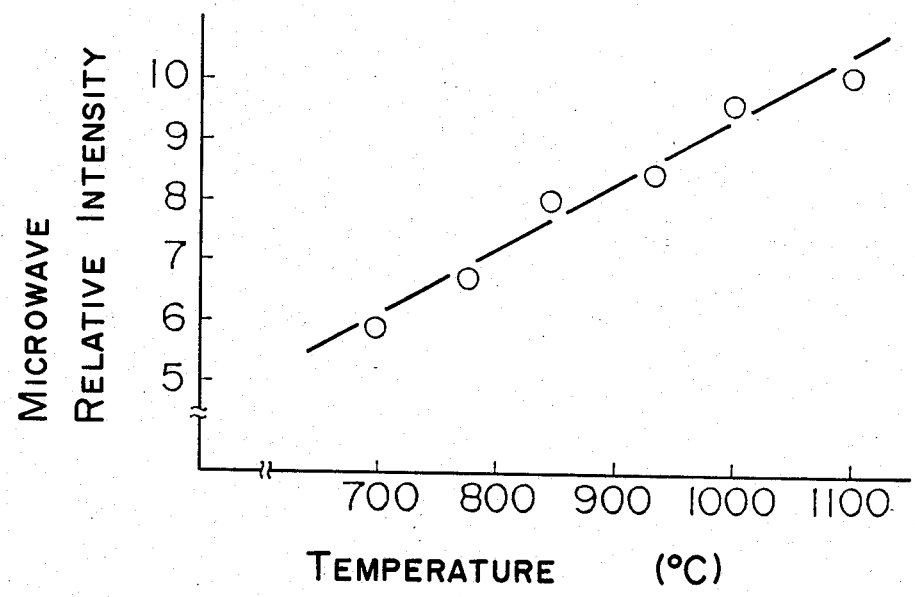
FIG. 2 is a graph potting the relationship between the temperature of the object subjected to heating and the infrared rays emitted from the object.

Through a hole 14 in the furnace wall, the microwaves were received by electromagnetic horn 15, which was positioned at A in the drawing, which location was chosen in view of the geometrical relation of burner 12, plate 10, and hole 14. A microwave input signal with a 3 cm wavelength and a frequency of 10 GHz was amplified and duplex detected by amplifier/duplex detector 16 and continuously compared in a lock-in amplifier 17 with microwaves from a reference noise source 19, the difference being read on meter 18A to determine the relative intensity of the microwaves from the object. With a specially-provided thermocouple the temperature of steel piece 10 was measured and its relationship to the intensity of the above-mentioned microwaves was plotted as shown on the graph in FIG. 2. A linear, high correlation was obtained. Following this, the steel piece was removed and electromagnetic horn 15 was positioned at B in the drawing, opposite the flame so that the influence, if any of the flame on the measurement could be directly found, location B being the best location for observing the flame. The burner was turned on and off repeatedly and the microwave intensity measured, but because virtually no change was observed, temperature measurement using microwaves did not give rise to error attributable to the burner flame. The reason for this is not completely clear, but because the density of the flame is low, the total mass of the microwave emission is limited, and compared with the microwave emission of the object being heated, is substantially smaller.

Because the size of the dust particles floating within the furnace is less than 1 mm, microwaves with a wavelength of 30 mm are not scattered, and errors can not occur. The result is that temperature measurement employing microwaves was identified as exhibiting advantages in a contaminated atmosphere.

Figure 3:
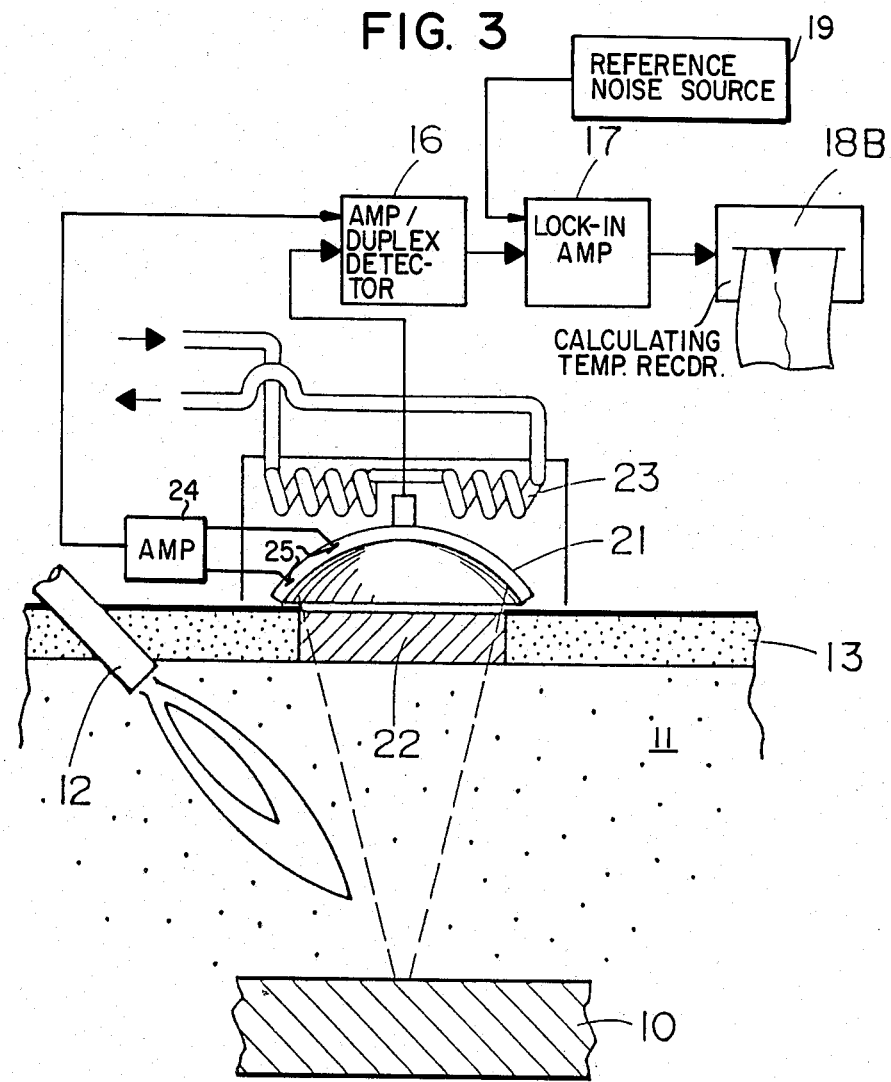
FIG. 3 is a conceptual drawing showing one example of the configuration of the apparatus of the present invention.

Based on the above-mentioned knowledge, the apparatus for measuring the temperature of an object of the present invention, if applied to a heating furnace, has the configuration shown in FIG. 3. The apparatus comprises parabolic antenna 21 provided at furnace wall 13 and facing the object 10 undergoing temperature measurement to receive microwaves of a specified wavelength, amplifier/duplex detector 16 amplifying and duplex detecting the microwaves of a specific wavelength received by the antenna, lock-in amplifier 17 to repeatedly compare the detected microwaves and the microwaves from the reference noise source 19 and to output this difference, as well as a calculating recorder 18B to convert the relative intensity of the microwaves and display the result as a temperature reading.

Parabolic antenna 21 increases the directivity of the incident waves and is used so that it is possible to measure the temperature of a specified surface area of the object in a furnace. Directivity, as is well known, is limited by the wavelength of the microwaves and the size of the parabola, and is indicated by half-strength angle. For example, when microwaves with a wavelength of 3 cm are received by a parabola with a 60 cm diameter, the half-strength angle is 1.5°, which covers an area of 10 cm diameter on an object at a distance of 2 m. This is considered to be a sufficient directivity.

From the viewpoint of required antenna size and directivity, the shorter the wavelength of the microwaves that should be utilized, the better. But, in order to carry out expediently the process after amplification and completely shutting out the influence of the suspended particles, longer waves are favorable. It is preferable to use microwaves with a relatively long wavelength of 1 to 10 cm, and a frequency of 30 to 3 GHz.

Because the sensitivity of the parabolic antenna fluctuates depending on its temperature, it is desirable to allow as little change in temperature as possible. In order to protect an antenna made of metal, a layer 22 of heat insulating material should be placed in front of the antenna, as shown in the drawing. It is desirable that the heat insulating material, for example alumina used for heat insulation, has high heat insulating properties and allows only limited attenuation of the microwaves with no rise in conductivity, even at high temperatures.

In place of, or, preferably, together with the heat insulating material, when a cooling device is furnished to maintain a constant antenna temperature, it adds considerably to the result. The fixed temperature installation, as shown in the drawing, allows cooling water to circulate through coil 23 and is easy to put into practice. Moreover, when accurate temperature measurement is desired, it is recommended to add a circuit which includes temperature sensor 24 on the antenna itself and a suitable amplifier 25 which compensates for the fluctuation in sensitivity associated with changes in the temperature of the parabolic antenna itself.

Temperature measurement of an object according to the present invention is in the 700° to 1,100° C. range, but the possibility of extending the high temperature domain to nearly 1,500° C. has been confirmed. This temperature domain practically covers the temperature range of the essential object being measured through a contaminated atmosphere, melted metal received by a ladle, steel materials about to undergo processing or heat treatment, and of course the temperature of objects within a common furnace. Consequently the sphere to which the technique of the present invention can be applied is wide.

We claim:

1. A method for measuring the temperature of steel pieces in a heating furnace having an atmosphere containing a flame and suspended particles, comprising:
    positioning a parabolic antenna facing a specific area of a surface of at least one of the steel pieces in the furnace,
    providing said parabolic antenna with a heat insulating material on its front surface;
    with said parabolic antenna receiving microwaves of a wavelength in the range of 1 to 10 cm emitted from said specific area of the surface of said at least one steel piece;
    measuring the intensity of the received microwaves as the flame is selectively turned on and off;
    compensating the measuring for fluctuation in sensitivity of the received microwaves associated with changes in the temperature of said parabolic antenna itself;
    comparing the intensity of the received, compensated microwaves with the intensity of microwaves of a reference noise source; and
    determining the relative intensity of the received microwaves to obtain the surface temperature of the at least one steel piece corresponding thereto.

2. The method as claimed in claim 1, further comprising:
    maintaining the temperature of said parabolic antenna constant.

* * * * *